March 10, 1931.  A. G. SCHLICHER  1,795,897
TRUCK BODY
Filed March 24, 1928  3 Sheets-Sheet 1
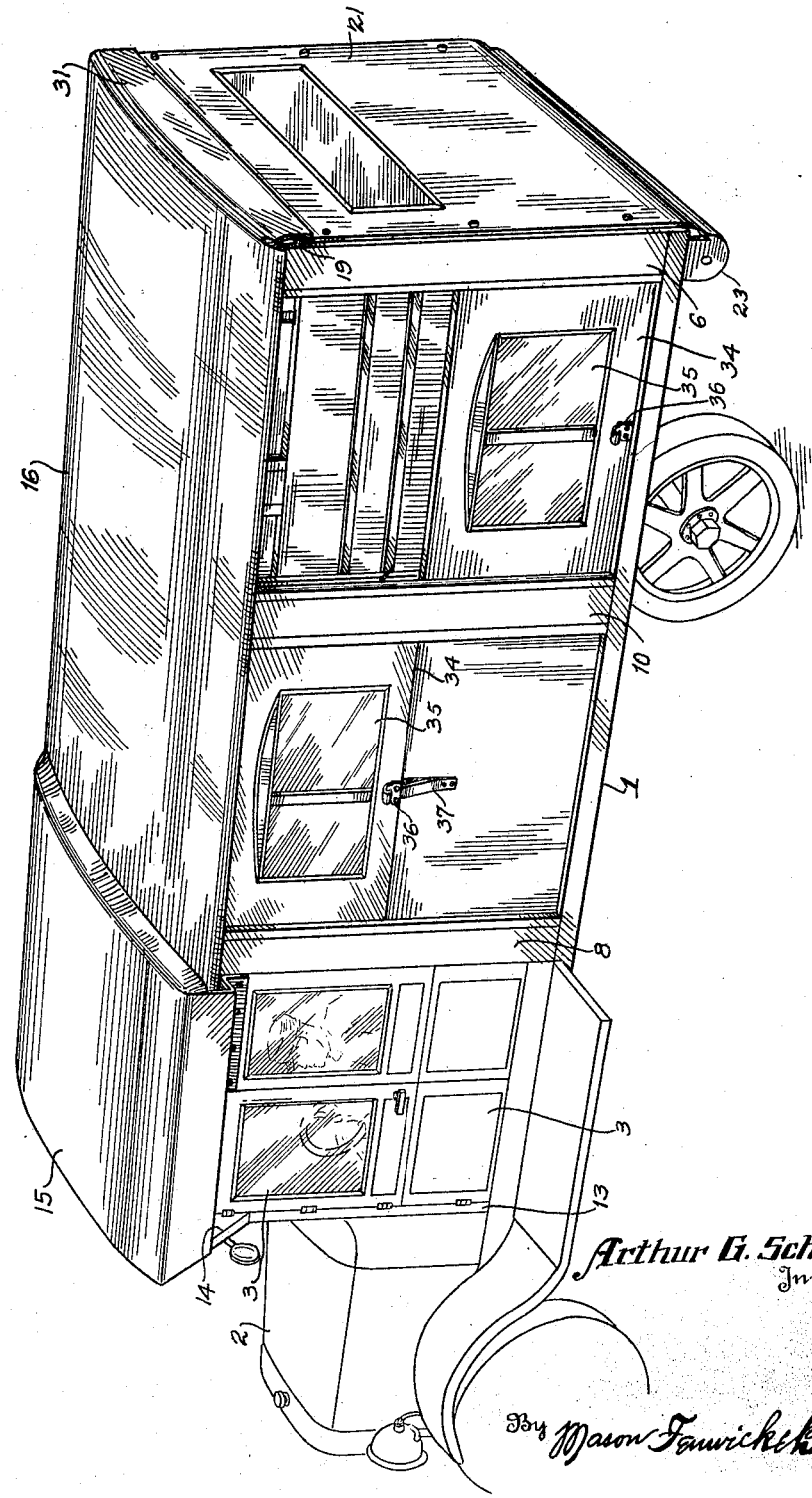

March 10, 1931.  A. G. SCHLICHER  1,795,897
TRUCK BODY
Filed March 24, 1928   3 Sheets-Sheet 2
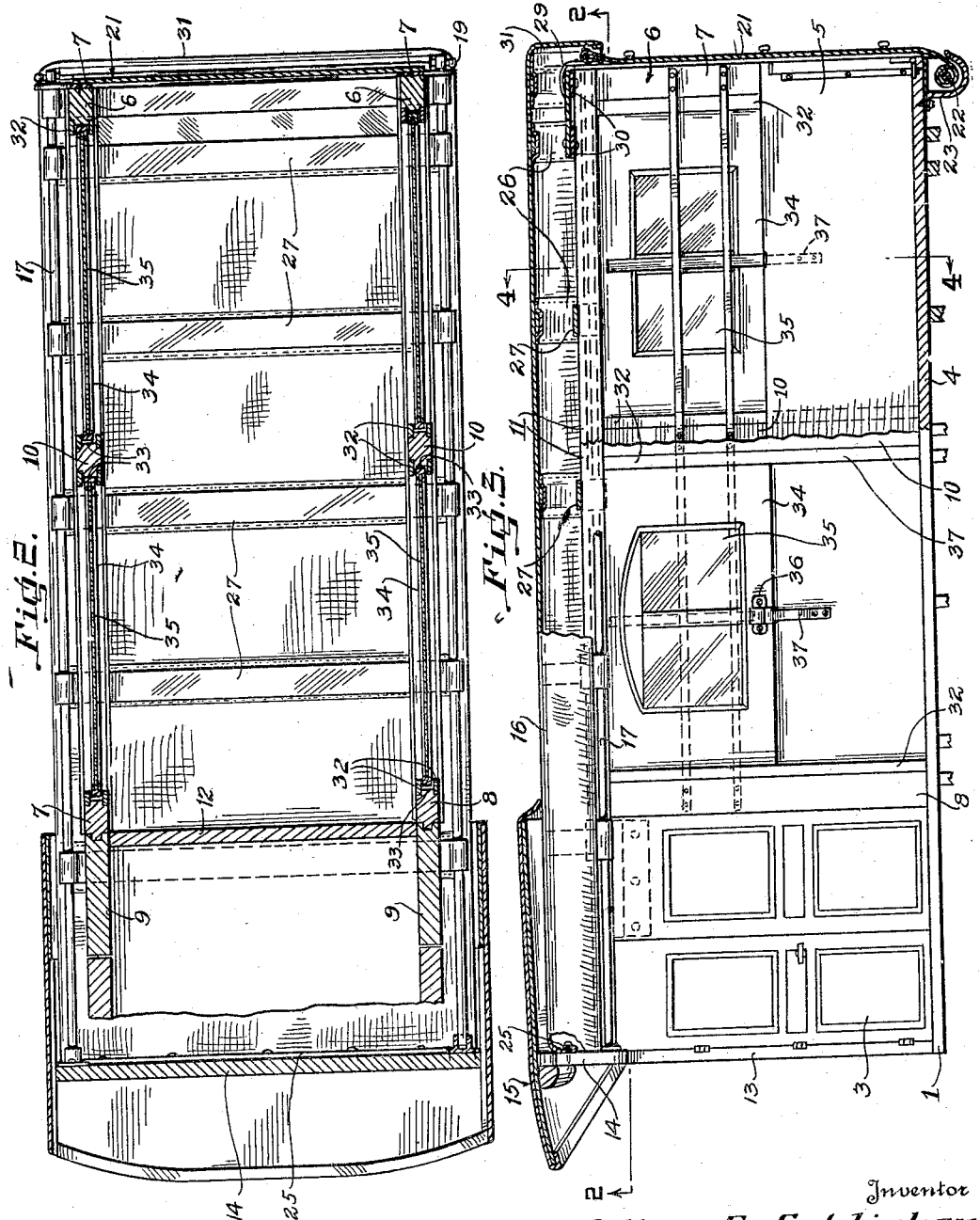
Inventor
Arthur G. Schlicher
By Mason Fenwick & Lawrence
Attorneys

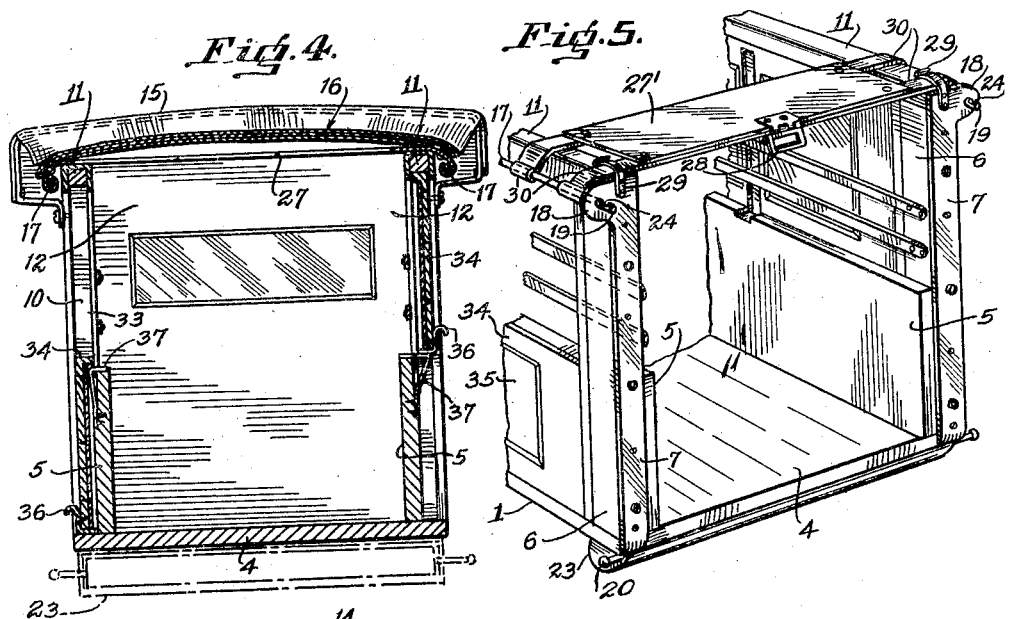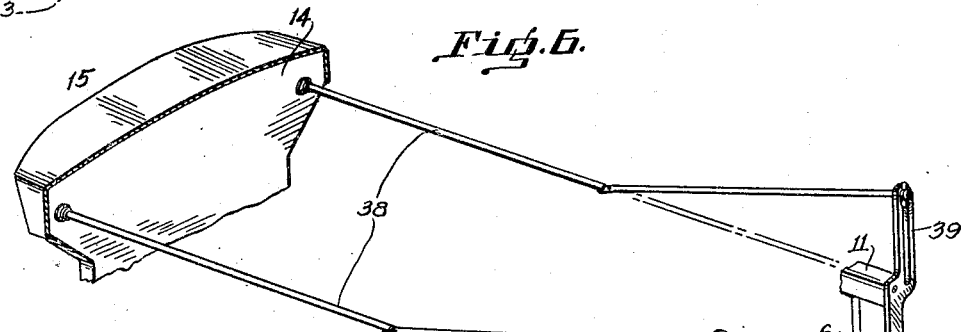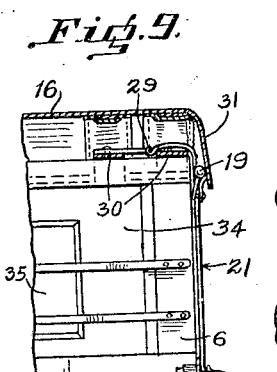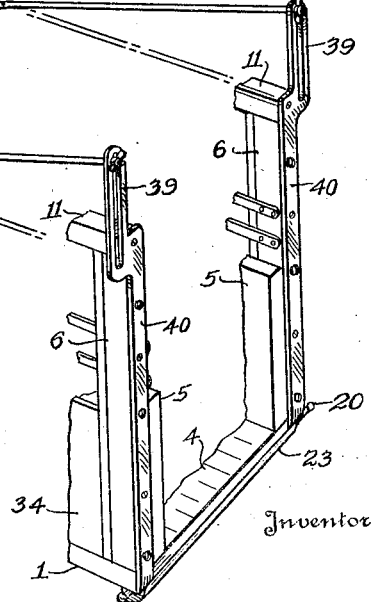

Patented Mar. 10, 1931

1,795,897

UNITED STATES PATENT OFFICE

ARTHUR GROVER SCHLICHER, OF ALLENTOWN, PENNSYLVANIA

TRUCK BODY

Application filed March 24, 1928. Serial No. 264,290.

This invention relates to vehicle bodies in general, and particularly to truck bodies of the automobile type.

The main object of the invention is to provide a vehicle body which can be very quickly converted from an open type body to a closed type.

A further object of the invention is to provide a convertible vehicle body which can be very cheaply constructed and with relatively adjustable parts, which can be quickly moved toward and from their various positions with very little effort.

Further objects of the invention will become apparent as the detailed description thereof proceeds.

In the drawings:

Figure 1 is a perspective view of the invention as a whole;

Figure 2 is a horizontal section taken on the line 2—2 of Figure 3;

Figure 3, is a side elevation of the truck body proper, with parts thereof broken away and shown in section;

Figure 4 is a vertical transverse section taken on the line 4—4 of Figure 3;

Figure 5 is a fragmentary perspective view of the rear end of the body;

Figure 6 is a fragmentary perspective view of a modification of the invention;

Figure 7 is a fragmentary side elevation of a joint in the top supporting rods shown in Figure 6;

Figure 8 is a plan view of the joint shown in Figure 7; and

Figure 9 is a fragmentary sectional view of another modified form of the invention.

In the form shown in Figures 1 to 5, inclusive, this invention is applied to the chassis 1 of an automobile truck provided with the usual engine covered by hood 2 and driver's cab 3.

The vehicle body comprises the floor 4, on which the sides 5 are mounted in any usual or suitable manner. (See Figures 4 and 5.) Standards 6 are secured to the sides 5 at their rear ends and have metal wear plates 7 suitably secured thereto. Standards 8 are suitably connected to the cab end of said sides 5 and are tongued and grooved into the side walls 9 of the cab 3, (see Figure 2); and intermediate standards 10 are suitably secured to the sides 5 to complete the top-supporting structure of the vehicle body.

The standards 6, 8 and 10 are all of the same height, and are suitably tenoned or otherwise framed into top rails 11 connecting the rear wall 12 of cab 3 to the tops of the rear standards 6.

The wind shield supporting framework 13 of cab 3 extends above the top rails 11, to form the front wall 14 (see Figures 2 and 3) of a casing 15 adapted to receive a collapsible top 16. The casing 15 extends over the top of the cab and terminates at the rear wall 12 thereof.

Guide rods 17 are secured at their opposite ends to the rear of wall 14 and to lugs 18 projecting laterally from the upper ends of wear plates 7, and have their notched rear ends 19 projecting rearwardly of said lugs to receive the stiffening rod 20 of a flexible end cover 21. This end cover 21 is of the spring roller shade type and is adapted to be rolled on the rod 22, suitably mounted in the casing 23 fixed below the rear end of the vehicle floor 1, the ends 19 of rods 17 being provided with notches 24 to receive and hold the ends of rod 20.

The flexible top 16 has its inner end 25 suitably fastened (see Figure 2) to the wall 14, and at spaced apart intervals is secured to the arcuate members 26 which have their ends suitably secured to the ends of slide members 27, which extend across the rails 11 and slide freely on the guide rods 17. The rear end slide member is provided with a handle 28 (see Figure 5) to facilitate the operation of the top 16, and springs 29 engage arms 30, projecting from said member to lock the top 16 yieldingly in closed position on the body, which has a flap 31 at its rear end adapted to overhang the upper end of curtain 21 and button thereto to seal the end of the vehicle body completely.

As shown in the drawing, the standards 6, 8 and 10 are rabbeted to receive plates 32, projecting beyond the edges of the standards to form grooves 33 adapted to receive slidable panels 34 which are provided with panes 35 of non-shatterable glass. A lifter 36, is secured to the lower rail of each panel 34, and depressible leaf springs 37, secured to the sides 5 of the body serve to hold the panels 34 in raised and vehicle closing positions.

In the modification shown in Figures 6 to 8, the guide rods 38 are articulated intermediate their ends, the front ends being rigidly secured to the wall 14, of the cab 3, and their movable rear ends being adjustably secured in slotted extensions 39 of the wear plates 40. The flexible cover 16 slides, as before, on these rods 38; but its rear half may be elevated to receive articles somewhat higher than the main body of the vehicle.

Figure 9 shows a modification having a tail board 41 hinged, as usual, to the rear end of the floor 4. In this case, the rear flexible cover 21 is fixed to the upper end of the tail board as shown. The other elements of this form of the invention are otherwise the same shown in Figures 1 to 5, and are similarly operated.

From the disclosure in this case it will be noted that the sides of this truck are of permanent construction, having fixed panels enclosing the lower half of the truck body, and having transparent slidable window panels which may be slid from their lowest position in front of the fixed panel to raised positions where they serve to close each side completely.

The flexible top 16 when collapsed is completely enclosed in the casing 15 over the driver's cab. This casing 15 is flush with the rear wall of the cap and, therefore, has no part overhanging the truck body to interfere in any way with the loading of goods higher than the casing 15. Furthermore, this casing forms a protective covering for the collapsed top which prevents injury to it by goods being loaded on to the open truck.

Another feature of great importance in this invention resides in the broad rear end slide member 27'. The spaced apart arms 30 at the ends of slide member 27' prevent the member 27' from binding on the guide rods 17, when the top is being collapsed, as they insure the sliding of this member always perpendicularly to these rods. The arrangement of the guide rods 17 outside the truck body also prevents their being bent or otherwise injured by the loading of the truck.

Having thus described my invention, what I claim is:

1. In a truck body, the combination of a driver's cab having a ceiling; a receptacle above the ceiling having a roof, front and side walls and open back, its front wall flush with the front cab wall and its side walls over reaching the cab side walls; near each side wall, a guide rod attached to the front wall of the receptacle, extending backward and supported on standards at the back corners of the body; spanning runners adapted to slide on the guide rods; and a flexible cover for the body, attached to the front wall and to the runners, all folding into the receptacle.

2. In a truck body, the combination of a driver's cab having a ceiling; a receptacle above the ceiling having a roof, front and side walls and open back, its front wall flush with the front cab wall and its side walls over reaching the cab side walls; near each side wall, a guide rod attached to the front wall of the receptacle, extending backward and supported on standards at the back corners of the body; a plurality of runners comprising bars adapted to slide on the guide rods; a terminal runner comprising two such bars spaced apart by a connecting member, to prevent cramping on the guide rods; and a flexible cover for the body, attached to the front wall and to the runners, all folding into the receptacle.

In testimony whereof I affix my signature.

ARTHUR GROVER SCHLICHER.